Feb. 26, 1957 P. MUSHOVIC ET AL 2,782,498
METHOD FOR MAKING COMPOSITE STOCK
Filed Nov. 14, 1950
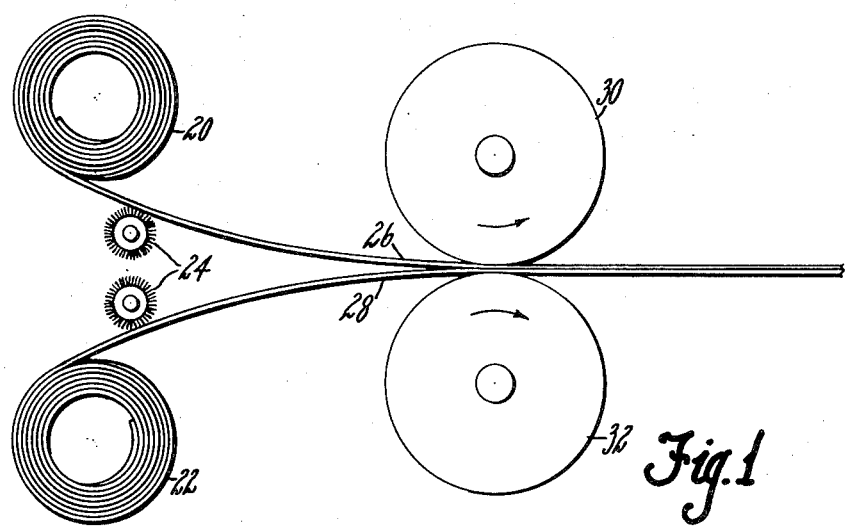
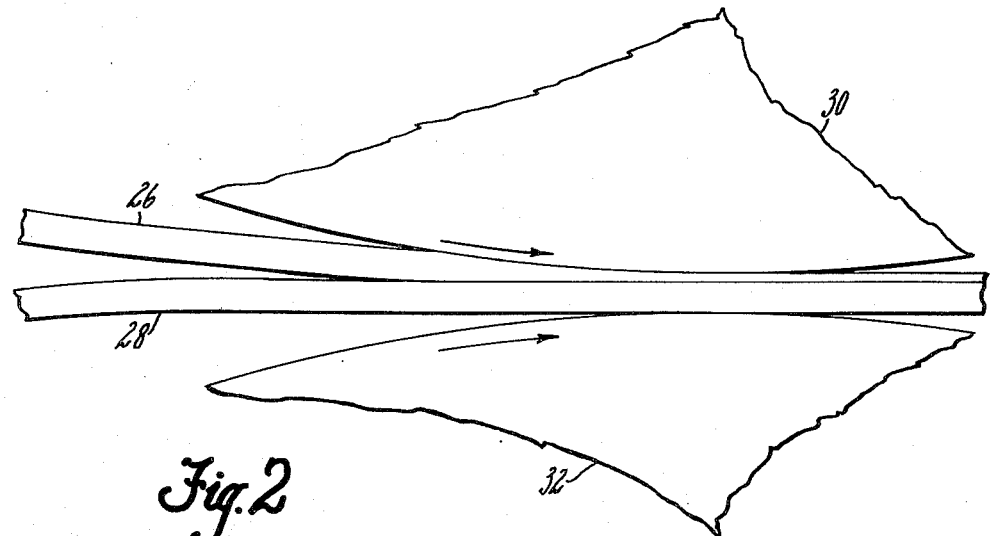
INVENTORS
PETER MUSHOVIC
HAROLD W. SCHULTZ
BY
THEIR ATTORNEYS United States Patent Office 2,782,498
Patented Feb. 26, 1957

2,782,498

METHOD FOR MAKING COMPOSITE STOCK

Peter Mushovic and Harold W. Schultz, Dayton, Ohio, assignors to General Motors Corporation, Detroit, Mich., a corporation of Delaware Application November 14, 1950, Serial No. 195,535

2 Claims. (Cl. 29—497.5)

This invention relates to bearings and is particularly concerned with methods for manufacturing aluminum bonded-to-steel bearings.

It is a basic object of the invention to provide a new and improved method of bonding aluminum onto steel or other relatively hard metal wherein a coextensive metallurgical bond is obtained between sheet aluminum and/or its alloys and steel. In carrying out the above object, it is a further object to provide a method for accomplishing this result either intermittently or continuously.

Another object of the invention is to provide a method for bonding aluminum and/or aluminum alloys to steel wherein no external heat is utilized and wherein the bonding operation is accomplished without a protective atmosphere.

In carrying out this object, it is a further object to extrude the aluminum sheet against the surface of the steel to produce a very thin layer of which is heated to a bonding temperature by the extrusion process per se, whereby a co-extensive bond is obtained without a brittle iron aluminum interlayer.

Further objects and advantages of the present invention will be apparent from the following description, reference being had to the accompanying drawings wherein preferred embodiments of the present invention are clearly shown.

In the drawings:

Fig. 1 shows diagrammatically the process described and claimed herein and Fig. 2 shows an enlarged view at the rolls of Fig. 1, wherein the extruding of the aluminum is shown.

In Schultz applications, Serial Nos. 100,431 and 100,432, both now abandoned, two methods for bonding aluminum and/or aluminum alloys to steel are disclosed. In one of these a grit blasted steel surface is utilized while in the other, a copper plated surface is provided on the steel. In each case the aluminum strip is drastically reduced in thickness and the entire organization of parts is heated to specific critical temperatures in a specific atmosphere during the bonding operation.

The present invention accomplishes similar results in a simplified manner. In the present invention, no external heat is actually induced into the steel or into the aluminum and no controlled atmosphere is used, the bonding being accomplished by an extrusion and abrading process produced by the drastic reduction in the thickness of the aluminum together with the specific treatment on the bonding surfaces of the steel and the aluminum.

We have found that steel and aluminum, the surfaces of which are cleaned and roughened, will bond together when rolled at high rolling pressures wherein up to 80% deformation is accomplished in the aluminum and wherein no substantial deformation is noted in the steel. In this manner, we actually force the aluminum to move at its juxtaposed surface relatively to the steel and longitudinally of the direction of travel of the strips for causing an abrading action. This abrasion, together with the extrusion of the aluminum strip, causes heating and cleaning directly at the point of bond which provides the optimum conditions for bonding. In fact, we believe that at the exact area of bonding, a very thin layer of the aluminum and/or aluminum alloy reaches a temperature that approaches and possibly equals the melting point thereof but that this area is so small that the heating of the entire organization of parts is negligible thereby avoiding the formation of an apparent brittle iron aluminum interlayer, while simultaneously producing a strong coextensive bond between the aluminum and steel.

In the drawings Fig. 1 shows diagrammatically a method for bonding aluminum strip to steel strip wherein a coil of aluminum or aluminum alloy is shown at 20 and a coil of steel is shown at 22, the steel may be of any satisfactory grade or analysis but should be sufficiently hard to prevent any substantial deformation thereof during the rolling operation. Strip aluminum and strip steel from the coils 20 and 22 are then scratch-brushed at the bonding surfaces by a pair of brushes 24, which brushes must produce a roughened surface on the elements to be bonded. In other words, the brushes actually dig into the surfaces and roughen them while simultaneously removing all surface oxides and dirt. If the metal strips have any grease or other extraneous material thereon, they should be washed and/or degreased prior to the scratch-brushing. After the bonding surfaces of the steel and aluminum have been scratch-brushed and roughened they are preferably juxtaposed and rolled as quickly as possible to limit oxidation and to limit or prevent other actions which may be detrimental to the bonding operation. In other words, the elements are preferably used as soon after the scratch-brushing as is feasible. Although if the cleaned surfaces are untouched and maintained clean, a considerable period of time may elapse between scratch brushing and bonding.

In practice, the two strips are preferably riveted together at their leading edges so that they are immovable with respect to one another. This is preferably done whether the process is continuous or intermittent since each time a pair of strips is initially passed into the rolls, the leading edges thereof should be held together so that the strips are immovable relative to one another at this point.

The juxtaposed strips now designated as 26 and 28 are next passed through pressure rolls 30 and 32 which are geared together and driven at a satisfactory speed, for example, at a speed that will pass in the order of 10 to 30 lineal feet of strip to be bonded per minute. In one specific embodiment 8" diameter rolls are used, running at about 7 R. P. M. to provide a lineal speed on the strip of about 14.6 feet per minute. When this specific operation is commenced, the rolls 30 and 32 must be heated to prevent them from extracting heat at the bonding area. Thus the rolls should be heated from 800° to 1010° F. depending on the degree of deformation of the aluminum strip. The heating of the rolls should be carried out inversely to the reduction in thickness of aluminum and to the speed of rolling and may vary from 1010° F. to 800° F. for deformations ranging from 65% to 80% at indicated speeds with a 900° to 950° F. temperature being used at a 70% reduction at about 15' per minute. In this connection, as the process progresses on a continuous basis, the temperature of the rolls 30 and 32 must be controlled so that the temperature at the bonding surfaces remains constant. As previously mentioned, the reduction in thickness of the aluminum layer is drastic and the rolls may be set to reduce the aluminum layer to between from 65 to 80% of its original thickness. This reduction in thickness produces an actual extrusion of the aluminum as noted in Fig. 2, wherein an enlarged view of the bight of the rolls is shown. The aluminum in this view will be noted as being elongated as it approaches and passes through the rolls whereby the bonding surface thereof is actually moving relative to the surface of the steel with a strong abrading action thereon whereby cleaning is accomplished and the aluminum is actually ribbed into the rough surface of the steel. Simultaneously, the extrusion of the aluminum and the abrading action thereof against the steel creates heat sufficient to actually cause a metallurgical bond to occur adjacent the bight of the rolls. In this connection, it is to be understood that the temperature of the rolls is important to the success of the present invention only to the extent that said rolls do not add or extract heat form the point of bonding between the strips and therefore the temperature of said rolls must be properly controlled to accomplish this end.

In practice, the steel strip is not deformed to any substantial extent and it is important here that a sufficiently hard strip is used to prevent substantial distortion since distortion of the steel strip destroys the bonding action to some extent since it reduces the abrading action due to relative movement between the aluminum and the steel. We have found that a 1010 S. A. E. cold rolled steel strip produces very satisfactory results when used with aluminum and aluminum alloys and that steel strips having a 90 Rockwell B hardness yield generally satisfactory results. Steels of other carbon content may be also used if the hardness is controlled.

In order to amplify the abrading action and the relative movement between the strips, we prefer to use an annealed aluminum strip to increase the difference in hardness between the two strips. In this connection, if the steel is sufficiently hard, the aluminum does not necessarily have to be annealed although such material is preferred.

We believe that the success of the bonding operation here depends on the following factors:

1. The relative hardness of the strips being bonded whereby substantially the entire deformation occurs in one of the strips;
2. The relative movement between the strips during the actual bonding operation as occasioned by the deformation of the softer strip;
3. The high degrees of deformation which causes an actual extrusion of the aluminum strip longitudinally of the strip which creates sufficient heat to cause the bonding action to occur;
4. The temperature control of the rolls to prevent the extraction or adition of heat at the bonding area;
5. The roughening of the surface of the strips to be bonded whereby oxides and extraneous materials are eliminated and wherein a rough surface is provided which enhances the bonding procedure;
6. The abrading action of the aluminum on the steel as caused by the extruding operation thereon which further cleans the surface of the steel and completely continuously disrupts the oxide film which has reformed on the surface of the aluminum to present a substantially "nascent" surface at the point of bond.

Bonds formed by the process herein disclosed have proven complete and strong and do not exhibit any brittle iron aluminum interlayer under microscopic examination thereof. The process as disclosed is simple to operate in view of the fact that no furnace or controlled atmosphere is necessary to protect the surfaces of the strips and since the bonding temperatures are provided by the deformation of one of the materials, little expense is occasioned in the operation of the process.

Any suitable type of pure aluminum or its alloys may be used or we may use a special bearing alloy as disclosed and claimed in Schluchter Patent No. 2,238,399.

It is to be understood that the novel method disclosed herein is useful with many materials not specifically mentioned herein. In this connection, any suitably hard steel or alloy steel may be used with any aluminum or aluminum alloy which is relatively softer. For this reason, the term steel as used in the appended claims is used in the generic sense and includes various suitable steel alloys while the term aluminum includes aluminum and its suitable alloys.

While the embodiments of the present invention as herein disclosed, constitute preferred forms, it is to be understood that other forms might be adopted.

What is claimed is as follows:

1. In a process for bonding aluminum to steel wherein the aluminum is relatively soft and the steel is relatively hard, the steps comprising; cleaning and roughening the bonding surfaces of both the aluminum and steel, fastening the aluminum to the steel to prevent relative movement thereof, rolling the aluminum and steel under pressure sufficient to deform the aluminum by 65% to 80% of its original thickness while simultaneously extruding the aluminum longitudinally of the steel and in the direction of rolling for causing relative movement between the aluminum and steel while maintaining the temperature of the aluminum and steel at the bight of the rolls substantially constant throughout the rolling operation and within temperature limits of between 1010° F. and 800° F., whereby a coextensive, strong and ductile bond devoid of brittle iron-aluminum interlayer is formed.

2. In a process for bonding aluminum to steel wherein the aluminum is relatively soft and the steel is relatively hard, the steps comprising; cleaning and roughening the bonding surfaces of both the aluminum and steel, fastening the aluminum to the steel to prevent relative movement thereof, rolling the aluminum and steel under pressure sufficient to deform the aluminum by 70% of its original thickness while simultaneously extruding the aluminum longitudinally of the steel and in the direction of rolling for cause in relative movement between the aluminum and steel while maintaining the temperature of the aluminum and steel at the bight of the rolls substantially constant throughout the rolling operation and within temperature limits of between 900° F. and 950° F., whereby a coextensive, strong and ductile bond devoid of brittle iron-aluminum interlayer is formed.

References Cited in the file of this patent

UNITED STATES PATENTS

| | | |
|---|---|---|
| 800,951 | Somers | Oct. 3, 1905 |
| 1,167,036 | Witham et al. | Jan. 4, 1916 |
| 1,554,097 | Jordan | Sept. 15, 1925 |
| 1,667,787 | Jaeger et al. | May 1, 1928 |
| 1,982,571 | Clark | Nov. 27, 1934 |
| 2,366,185 | Diehl | Jan. 2, 1945 |
| 2,522,408 | Sowter | Sept. 12, 1950 |